Sept. 4, 1956
C. E. LENZ
2,761,493
UPHOLSTERY CUSHIONS
Filed July 7, 1952
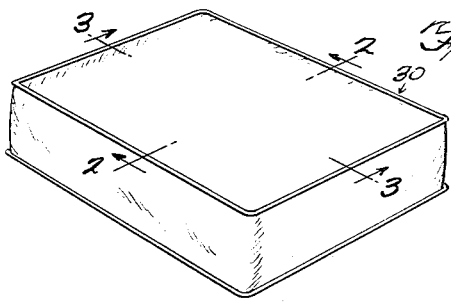
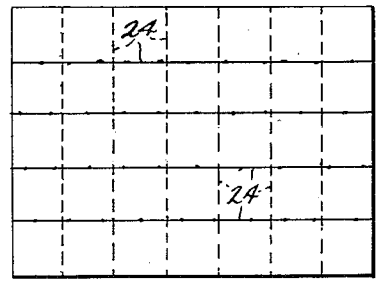
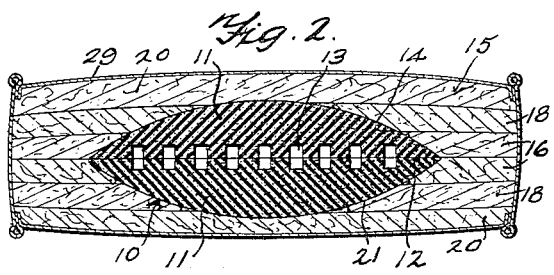
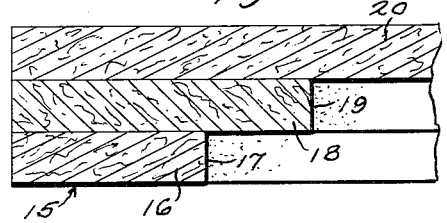
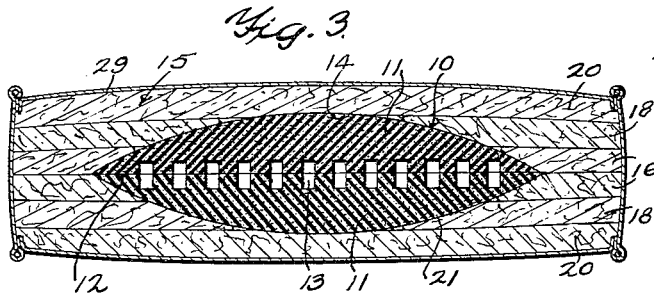
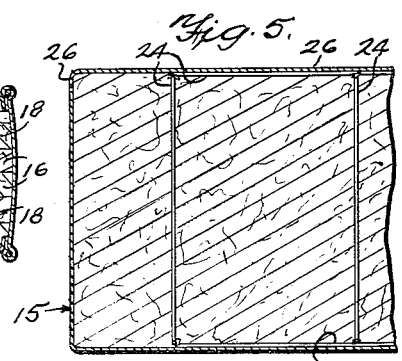
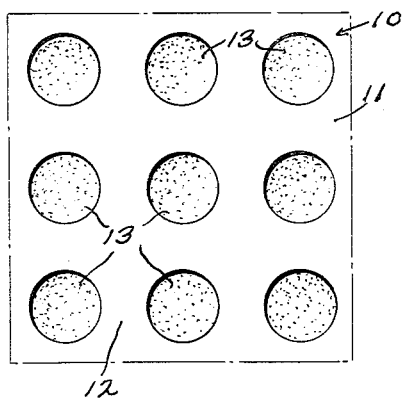
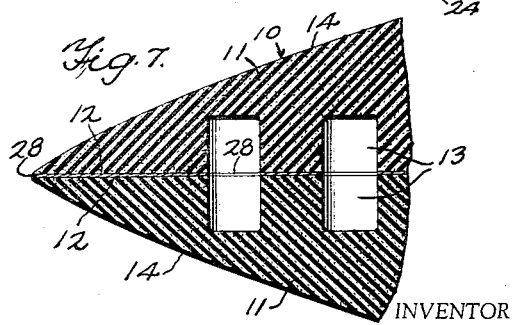
INVENTOR
CHARLES E. LENZ
BY Baldwin & Wight
ATTORNEY

United States Patent Office
2,761,493
Patented Sept. 4, 1956

2,761,493

UPHOLSTERY CUSHIONS

Charles E. Lenz, Ruxton, Md.

Application July 7, 1952, Serial No. 297,527

10 Claims. (Cl. 155—179)

This invention relates to upholstery cushions, and more particularly to loose cushions for upholstered chairs, davenports, etc.

It has been the common practice for many years in the manufacture of cushions for furniture to provide a core of relatively closely spaced coil springs covered by cotton batting or similarly loosely filled material, and to place the structure thus formed in a fabric covering to form the finished cushion. The springs employed in such structures must be anchored in position and tied to limit their expansion, and the springs are relatively expensive to buy and accordingly to install. Numerous efforts have been made to provide a satisfactory substitute core for the spring structures referred to, and while a certain degree of success has been attained, such structures never provided the comfortable resiliency of spring-filled cushions. The cost of manufacturing the spring structures renders it even more desirable to find a substitute for spring-filled cushions.

An important object of the present invention is to provide a novel type of substitute core for the spring structures of spring-filled cushions wherein such substitute core may be relatively easily manufactured of such material as foam rubber and which provides the finished cushion with a degree of comfort and resiliency in use which is comparable to a spring-filled cushion.

A further object is to so form a core of the character referred to as to provide the highest degree of resiliency adjacent the points at which the greatest weight is supported by the cushion, namely substantially centrally thereof.

A further object is to provide a core structure as a whole for cushions comprising a core unit of the character referred to and a surrounding loose fibrous structure of such nature as to cooperate with the core element to retain the latter in position and substantially to retain its own shape and resiliency over long periods of time.

A further object is to provide such a core structure as a whole wherein the material surrounding the core element is in the nature of loosely felted material such as cotton batting, and wherein such structure is so formed as to provide an internal pocket substantially corresponding in shape to the foam rubber core element.

A further object is to provide such a core structure as a whole wherein the filler material surrounding the foam rubber core element is reinforced by loose stitching to minimize horizontal elongation of the layers of which the filler structure is formed.

A further object is to provide such a filler structure wherein some or all of the surfaces of the layers are coated with a binding material to increase the stability of the layers of filler material, thus materially lengthening the life of the cushion, and permitting, if desired, the shipping of the core structure as a whole, without a fabric covering thereon, to furniture manufacturers to be embodied by them in a cushion surrounded by a fabric covering selected and applied by such manufacturers.

Other objects and advantages of the present invention will become apparent during the course of the following description.

In the drawing, I have shown one embodiment of the invention. In this showing,

Figure 1 is a small perspective view of a cushion embodying the invention, and illustrating the fact that the cushion is conventional in appearance, Figure 2 is a sectional view on line 2—2 of Figure 1, somewhat enlarged, Figure 3 is a similar view on line 3—3 of Figure 1, Figure 4 is an enlarged fragmentary sectional view showing a portion of a plurality of layers of filler material and illustrating how such material is cut to form the core-receiving pocket, Figure 5 is a similar view, substantially further enlarged, showing a single thickness of a portion of one layer of filler material indicating how such layers are stitched and coated with a binder, Figure 6 is a face view on a reduced scale of one of the layers of filler material showing a preferred form of stitching applied thereto, Figure 7 is an enlarged fragmentary sectional view of one edge portion of the foam rubber core element showing the cementing of the edge portions thereof, and Figure 8 is a fragmentary face view of a portion of the inner face of one of the sections from which the core element is formed.

Referring to the drawing, the numeral 10 designates a core element as a whole formed of preferably identical sections 11 having normally flat contacting surfaces 12 provided with surface indentations 13 of substantial depth. The indentations of the sections 11 may register or not, and the indentations provide spaces which allow for increased deformability of the sections 11, these sections in themselves possessing a high degree of deformability for the reason that they are formed of foam rubber. The outwardly facing surfaces 14 of the sections 11 may be smooth and are convex transversely and longitudinally of the cushion as indicated in Figures 2 and 3.

The core element 10 is wholly surrounded by a filler structure indicated as a whole by the numeral 15 and formed of a plurality of layers of suitable loose fibrous material, for example cotton batting. In the present instance, the filler 15 is shown as being formed of six layers. It will be noted that the convex formation of the surfaces 14 "feathers" the edges of the core element 10 and certain of the layers of filler material 15 have internal openings forming a pocket to receive the core element 10 shaped as stated. The two innermost layers 16 of the filler 15 are provided with openings 17 (Figure 4) corresponding to the shape of the core element 10 and preferably slightly smaller than such element at the feathered edge thereof. The next adjacent layers 18 of the core structure are provided with smaller openings 19 (Figure 4) while the outermost layers 20 of the filler structure are solid from edge to edge as shown in Figures 2 and 3. The edges 17 and 19 will be somewhat deformed when the device is assembled, and they cooperate with the inner faces of the layers 20 to form a pocket 21 corresponding approximately in shape to the core element 10 as shown in Figures 2 and 3.

The layers 16, 18 and 20 preferably are loosely stitched therethrough as at 24 (Figure 5) and these stitches preferably extend perpendicular to each other in alternate layers, as suggested in Figure 6. If desired, only the outermost layers 20 need be stitched, but it is preferred that the stitching be applied to all layers to increase the stability thereof by minimizing any tendency for the layers to pull or stretch horizontally. It is unnecessary to stitch each filler layer in both directions since the longitudinal stitching of alternate layers tends to prevent stretching of the entire filler structure parallel to the lines of such stitches. Similarly, the transverse stitching of the remaining layers tends to prevent stretching of the entire filler structure transversely of the cushion.

At least the outermost layer 20 is coated as at 26 with a layer of a binder, which may be a suitable resin, starch or plastic. Preferably, this binder is applied to all horizontal surfaces of the various layers 16, 18 and 20 and to the outer edges thereof as shown in Figure 5.

The two sections 11 of the core element may be readily molded independently of each other, and obviously they may be formed in the same mold. These sections are assembled by applying cement 28 to the contacting surfaces thereof, at least around the edge portions thereof. The core element thus assembled may be placed in the lower set of layers 16, 18 and 20, whereupon the upper layers 16, 18 and 20 may be successively placed in position. The unit thus formed then may be placed within a surrounding fabric, plastic or other suitable type of covering to form the finished cushion 30 shown in Figure 1. If desired, the binder material 26 may be applied to horizontal surfaces of the filler material and the binder for the edges of the layers may be applied after the assembly of the layers around the core element 10. This will tend to bind together the various layers and, in practice, it has been found that the unit thus formed, including the core element and the filler layers, possesses a high degree of stability so that it may be shipped to furniture manufacturers as a unit to be embodied by them in covers 29 of their own selection.

In accordance with conventional practice, the top and bottom surfaces of the finished cushion bulge somewhat as in Figures 2 and 3. However, the core element 10 is more sharply convexed and thus provides the greatest core element depth, and consequently the highest degree of resiliency adjacent the center of the cushion where such resiliency is most needed. This arrangement also provides for the making of pocket openings 17 and 19 in certain of the layers to form the finished pocket 21, thus anchoring the core element 10 in its proper position within the cushion. The finished cushion has been found to provide a high degree of resiliency comparable with that of cushions employing spring cores, and the cushion is quite rugged and stable and will last for long periods of time without becoming deformed or misshapen.

I claim:

1. A core structure for a cushion comprising a plurality of layers of relatively soft filler material, the innermost layers being provided with relatively large openings therethrough and the next adjacent layers having relatively smaller openings therethrough to form an internal pocket within said filler material, and a core element of foam rubber corresponding generally in shape to and arranged in said pocket.

2. A core structure for a cushion comprising a plurality of layers of relatively soft filler material, the innermost layers being provided with relatively large openings therethrough and the next adjacent layers having relatively smaller openings therethrough to form an internal pocket within said filler material, a core element of foam rubber corresponding generally in shape to and arranged in said pocket, and a coating of a flexible binder applied to the top and bottom surfaces of certain of said layers of filler material to add stability thereto.

3. A core structure for a cushion comprising a plurality of layers of relatively soft filler material, the innermost layers being provided with relatively large openings therethrough and the next adjacent layers having relatively smaller openings therethrough to form an internal pocket within said filler material, a core element of foam rubber corresponding generally in shape to and arranged in said pocket, a coating of a flexible binder applied to the top and bottom surfaces of certain of said layers of filler material to add stability thereto, and stitching extending through at least the outermost layers of said filler material and extending across each such layer in one direction to minimize stretching of each such layer in such direction.

4. A core structure for a cushion comprising a plurality of layers of relatively soft filler material, the innermost layers being provided with relatively large openings therethrough and the next adjacent layers having relatively smaller openings therethrough to form an internal pocket within said filler material, a core element of foam rubber corresponding generally in shape to and arranged in said pocket, a coating of a flexible binder applied to the top and bottom surfaces of certain of said layers of filler material to add stability thereto, and stitching extending through at least a plurality of said layers including the outermost layers, said stitching extending substantially throughout a horizontal dimension of each such layer in one direction to minimize stretching or pulling of said filler material.

5. A core structure for a cushion comprising a plurality of layers of loose soft fibrous material, the innermost layers having relatively large openings therethrough and the next adjacent layers having relatively smaller openings, such openings cooperating with the surfaces of the layers of filler material outwardly thereof to form an internal pocket in said filler material, a core element of foam rubber corresponding generally in shape to and arranged in said pocket, and layers of a flexible binder bonded to a plurality of the surfaces of said layers including the top surface of the top layer, the bottom surface of the bottom layer, and the outer edge surfaces of all of said layers.

6. An article constructed in accordance with claim 5 wherein a plurality of said layers, including at least the top and bottom layers, are loosely stitched therethrough along lines extending at least in one direction across each such layer to minimize longitudinal pulling of such layers along the lines of stitching.

7. A core structure for a cushion comprising a body of a relatively soft deformable fibrous filler material cut away to form an internal pocket, and a foam rubber core element corresponding generally in shape to and arranged in said pocket, said core element having substantially convexed top and bottom surfaces and the filler material adjacent the center of such core element, without deforming, being relatively thinner than the filler material adjacent the edge portions of said core element.

8. A core structure for a cushion comprising a plurality of layers of relatively soft material, the innermost layers being provided with relatively large openings therethrough and the next adjacent layers having relatively smaller openings therethrough to form an internal pocket within said filler material, each layer of filler material having lines of stitching therethrough extending in one direction along each such layer, the lines of stitching of alternate layers being perpendicular to each other, and a core element of foam rubber corresponding generally in shape to and arranged in said pocket.

9. A core structure for a cushion comprising a plurality of layers of relatively soft material, the innermost layers being provided with relatively large openings therethrough and the next adjacent layers having relatively smaller openings therethrough to form an internal pocket within said filler material, each layer of filler material having lines of stitching therethrough extending in one direction along each such layer, the lines of stitching of alternate layers being perpendicular to each other, a coating of a flexible binder applied to at least one horizontal surface of at least a plurality of said layers of filler material to add stability thereto, and a core element of foam rubber corresponding generally in shape to and arranged in said pocket.

10. A core structure for a cushion comprising a plurality of layers of relatively soft filler material, the innermost layers being provided with relatively large openings therethrough and the next adjacent layers having relatively smaller openings therethrough to form an internal pocket within said filler material, and a core element of highly resilient material corresponding generally in shape to and arranged in said pocket.

References Cited in the file of this patent

UNITED STATES PATENTS

| | | |
|---|---|---|
| 752,147 | Derick | Feb. 16, 1904 |
| 1,211,548 | Courts | Jan. 9, 1917 |
| 1,928,568 | Loomis | Sept. 26, 1933 |
| 2,249,888 | Dodge | July 22, 1941 |
| 2,315,391 | Blair | Mar. 30, 1943 |
| 2,368,930 | Lenz | Feb. 6, 1945 |
| 2,570,736 | West | Oct. 9, 1951 |
| 2,619,659 | Futterknecht | Dec. 2, 1952 |

OTHER REFERENCES

Home Craftsman Mag. pp. 20, 21 and 54, January–February 1951.